US009180849B2

(12) United States Patent
Grebe et al.

(10) Patent No.: US 9,180,849 B2
(45) Date of Patent: Nov. 10, 2015

(54) PRESSURE CONTROL VALVE ARRANGEMENT HAVING A PRESSURE MEDIUM CHANNEL OF OVAL CROSS-SECTION

(75) Inventors: Jan Grebe, Starnberg (DE); Dirk Brenner, Stuttgart (DE); Jochen Weippert, Munich (DE); Wolfgang Rohn, Munich (DE); Harald Jaehns, Munich (DE)

(73) Assignee: KNORR-BREMSE SYSTEME FUER NUTZFAHRZEUGE GMBH, Munich (DE)

( * ) Notice: Subject to any disclaimer, the term of this patent is extended or adjusted under 35 U.S.C. 154(b) by 177 days.

(21) Appl. No.: 13/381,054

(22) PCT Filed: Jun. 24, 2010

(86) PCT No.: PCT/EP2010/059021
§ 371 (c)(1),
(2), (4) Date: Mar. 23, 2012

(87) PCT Pub. No.: WO2011/000779
PCT Pub. Date: Jan. 6, 2011

(65) Prior Publication Data
US 2012/0175942 A1 Jul. 12, 2012

(30) Foreign Application Priority Data
Jun. 29, 2009 (DE) .......................... 10 2009 030 901

(51) Int. Cl.
B60T 8/36 (2006.01)
B60T 8/48 (2006.01)
B60T 8/88 (2006.01)

(52) U.S. Cl.
CPC ............. *B60T 8/3605* (2013.01); *B60T 8/4818* (2013.01); *B60T 8/885* (2013.01)

(58) Field of Classification Search
CPC ... B60T 8/3605; B60T 15/027; B60T 8/3675; B60T 8/362
USPC ........ 303/118.1, 119.1, 119.2, 119.3; 138/39; 285/148.22, 179, 183
See application file for complete search history.

(56) References Cited

U.S. PATENT DOCUMENTS 1,950,947 A * 3/1934 Mulroyan ................ 285/148.22
3,976,335 A 8/1976 Sekiguchi
(Continued)

FOREIGN PATENT DOCUMENTS

DE 34 44 865 6/1986
DE 3916639 A1 * 11/1990 ................ B60T 8/36
(Continued)

OTHER PUBLICATIONS

International Search Report of PCT/EP2010/059021, dated Sep. 24, 2010.
(Continued)

*Primary Examiner* — Bradley King
*Assistant Examiner* — Stephen Bowes
(74) *Attorney, Agent, or Firm* — Kenyon & Kenyon LLP

(57) ABSTRACT

A pressure control valve arrangement is described for controlling a fluid pressure in an ABS brake system of a vehicle such that, in the event of a tendency of individual wheels of the vehicle to lock, the brake pressure in at least one associated brake cylinder can be adaptively adjusted, including: a housing in which is formed at least one pressure-medium-conducting pressure medium duct and in which is provided a diversion of the flow of the pressure medium within the pressure medium duct from a portion of the pressure medium duct leading in one direction into a portion of the pressure medium duct leading in another direction, in which the pressure medium duct is produced together with the housing by primary forming, and in which the cross section of the pressure medium duct is oval and the major dimension of the oval cross section and the central axis of the pressure medium duct are arranged in a common plane, and the minor dimension of the oval cross section is perpendicular to the plane.

8 Claims, 4 Drawing Sheets

(56) References Cited

U.S. PATENT DOCUMENTS

| | | | | |
|---|---|---|---|---|
| 5,100,208 | A * | 3/1992 | Angermair | 303/36 |
| 5,118,169 | A * | 6/1992 | Moller | 303/118.1 |
| 5,673,978 | A | 10/1997 | Linkner | |
| 5,733,018 | A * | 3/1998 | Goebels et al. | 303/118.1 |
| 5,845,748 | A * | 12/1998 | Schaefer et al. | 188/273 |
| 6,173,738 | B1 * | 1/2001 | Opara et al. | 137/508 |
| 6,209,971 | B1 * | 4/2001 | Ho et al. | 303/119.3 |
| 2002/0171287 | A1 | 11/2002 | Ohishi et al. | |
| 2005/0087243 | A1 | 4/2005 | Shaw et al. | |
| 2006/0102242 | A1 * | 5/2006 | Harpenau | 138/157 |
| 2009/0026761 | A1 * | 1/2009 | McMillan | 285/179 |

FOREIGN PATENT DOCUMENTS

| | | | |
|---|---|---|---|
| DE | 197 01 200 | 7/1998 | |
| DE | 198 16 289 | 8/1999 | |
| DE | 101 56 773 | 6/2003 | |
| DE | 10 2005 049654 | 4/2007 | |
| EP | 352522 A1 * | 1/1990 | B60T 8/34 |
| EP | 0 266 555 | 5/1998 | |
| FR | 2584988 A3 * | 1/1987 | B60T 15/36 |
| JP | 05024531 A * | 2/1993 | B60T 13/40 |

OTHER PUBLICATIONS

European Patent Office, International Preliminary Report on Patentability, Jan. 12, 2012, from International Patent Application No. PCT/EP2010/059021, filed on Jun. 24, 2010.

European Patent Office, English Translation of International Preliminary Report on Patentability and Written Opinion, Jan. 26, 2012, from International Patent Application No. PCT/EP2010/059021, filed on Jun. 24, 2010.

* cited by examiner

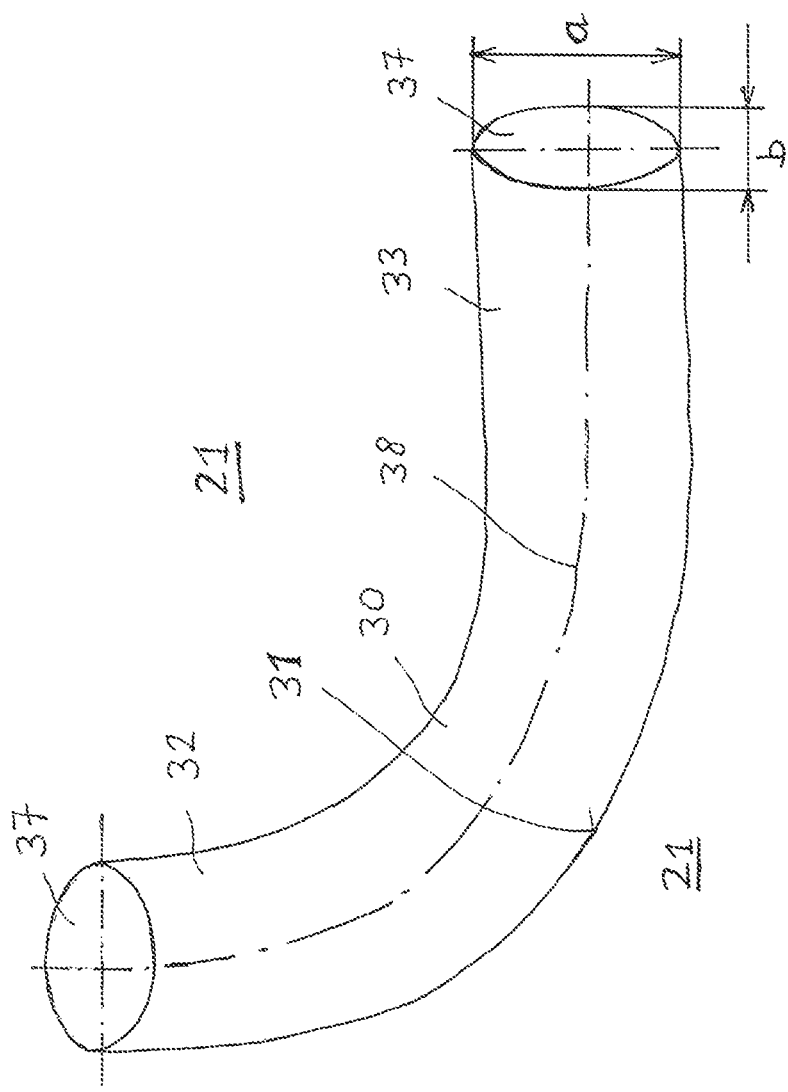

PRESSURE CONTROL VALVE ARRANGEMENT HAVING A PRESSURE MEDIUM CHANNEL OF OVAL CROSS-SECTION

FIELD OF THE INVENTION

The present invention relates to a pressure control valve arrangement for controlling the fluid pressure in an ABS brake system of a vehicle such that, in the event of a tendency of individual wheels of the vehicle to lock, the brake pressure in at least one associated brake cylinder can be adaptively adjusted, wherein in a housing of the pressure control valve arrangement there is formed at least one pressure-medium-conducting pressure medium duct and there is provided a diversion of the flow of the pressure medium within the pressure medium duct from a portion of the pressure medium duct leading in one direction into a portion of the pressure medium duct leading in another direction, as per the description herein.

BACKGROUND INFORMATION

ABS (anti-lock braking systems) prevent the wheels from locking, and perform their function if greater traction is demanded between a tire and the roadway than can be transmitted, that is to say if the driver overbrakes. In the event of overbraking, the central electronic control unit of the ABS brake system detects, from rotational speed sensor signals, a tendency of one or more wheels to lock, and from this calculates the activation of the pressure control valve arrangement acting on the associated brake cylinders. The brake pressure is then adjusted, by being lowered, held or built up, by the pressure control valve arrangement as a function of the wheel behavior, and the friction conditions between the tire and roadway are thereby set to an optimum level of slip.

ABS pressure control valve arrangements without a relay action are used in vehicles such as for example utility vehicles, omnibuses, semitrailer tractors and also in trailers. Pressure control valve arrangements without a relay action generally have 3/2 directional control solenoid valves as pilot control valves of diaphragm valves, wherein an electronic control device activates the 3/2 directional control solenoid valves so as to be able to carry out the "pressure holding", "pressure dissipation" and "pressure build-up" functions required for ABS operation. During a braking operation without ABS response (no tendency of a wheel to lock), the pressure medium, usually air, flows through the pressure control valve arrangements unhindered in both directions during the aeration and deaeration of the brake cylinders. It is thereby ensured that the function of the service brake system is not influenced by the ABS pressure control valve arrangement.

Pressure control valves of the generic type as single-duct pressure control valves for anti-lock systems of motor vehicles have, within the housing, in each case one diaphragm valve as a holding valve and as an outlet valve, and in each case one electromagnetic control valve for the holding valve and the outlet valve. The two diaphragm valves comprise in each case one diaphragm which can be acted on with the pressure in a control chamber, wherein the control chamber is closed off to the outside by a cover fastened to the housing.

A generic pressure control valve arrangement of an ABS brake system is discussed for example in EP 0 266 555 A1. In the pressure control valve arrangements of the prior art, the two diaphragm valves are usually arranged on the side of the housing, wherein the corresponding pilot control chambers are closed off by covers fastened to the side of the housing. The covers are produced by primary forming processes such as injection molding. Furthermore, pressure medium ducts are formed in the housing in order to conduct pressure medium within the housing from and to the various ports of the pressure control valve and to and from the diaphragm valves and from and to the electromagnetic valves which control the diaphragm valves.

The pressure medium ducts in the housing of the pressure control valve arrangement according to EP 0 266 555 A1 are manufactured in a cutting process and may be run in a vertical and/or horizontal direction, because then it is not necessary for the housing to be re-clamped during the cutting manufacturing of the pressure medium ducts, for example by a machining center. A diversion of a pressure medium duct is thus realized in that in each case one vertical and one horizontal bore overlap. A problem from a flow aspect is a resulting diversion of a pressure medium duct, because the diversion takes place abruptly in the intersection region between the vertical bore and the horizontal bore, and relatively large flow losses arise as a result of the abrupt diversion. However, because high dynamics are demanded of pressure control valve arrangements of ABS/ASR systems, and for example during the course of the "pressure reduction" function in the event of an exceedance of the admissible wheel slip as fast as possible a deaeration of the relevant brake cylinder is demanded, such flow losses caused by diversions must be kept as small as possible.

Because the installation dimensions, in particular the installation width, of a pressure control valve arrangement of the type are standardized and cannot be varied owing to restricted spatial conditions, a solution to the problem cannot involve the enlargement of the flow cross sections of the pressure medium ducts.

SUMMARY OF THE INVENTION

The exemplary embodiments and/or exemplary methods of the present invention are in contrast based on the object of developing a pressure control valve arrangement of the type mentioned in the introduction such that the flow losses and the flow resistance in particular in pressure medium ducts which divert a pressure medium flow are reduced. Here, the production and manufacturing outlay for the means to achieve the object should be as low as possible.

The object is achieved according to the exemplary embodiments and/or exemplary methods of the present invention by the features described herein.

The exemplary embodiments and/or exemplary methods of the present invention provide that the pressure medium duct be produced together with the housing by primary forming, wherein the cross section of the pressure medium duct is oval and the major dimension of the oval cross section and the central axis of the pressure medium duct are arranged in a common plane, and the minor dimension of the oval cross section is perpendicular to the plane.

As a result, the pressure medium duct is of narrower construction measured across its flow cross section perpendicular to the plane comprising the central axis, which is advantageous with regard to the restricted installation space of such pressure control valve arrangements. It is therefore also possible for multiple such pressure medium ducts to be arranged with their minor dimension b in each case adjacent to one another without the dimensions of the pressure control valve arrangement in the direction becoming too large, or the diameter of adjacent pressure medium ducts can be made larger.

Secondly, owing to the primary forming of the pressure medium duct together with the housing, it is possible to dispense with cutting manufacturing of vertical and horizontal portions of the pressure medium duct, and the associated relatively high flow losses. In fact, owing to the possibility, provided by the primary forming, of using free surfaces, the diversion of the flow of the pressure medium within the pressure medium duct from the portion leading in one direction into the portion leading in the other direction can be optimized in terms of flow.

The flow-guiding or flow-diverting pressure medium guiding surface, which may be of knee-like configuration, of the pressure medium duct at the diversion of the flow from the portion leading in one direction into the portion leading in the other direction may then be configured such that the flow losses or flow resistances arising in the pressure medium duct are reduced.

Owing to the reduced flow resistance, improved dynamics of the pressure control valve arrangement are consequently obtained with an unchanged flow cross section of the pressure medium duct in question, which has a positive effect with regard to the demanded fast succession of pressure dissipation, pressure holding and pressure increasing phases.

Advantageous refinements of and improvements to the exemplary embodiments and/or exemplary methods of the present invention specified herein are possible by the measures specified in the subclaims.

It may be preferable for the cross section of the pressure medium duct, as a special case of an oval cross section, to be of elliptical configuration, wherein again the major dimension (principal axis) of the elliptical cross section and the central axis of the pressure medium duct are arranged in a common plane and the minor dimension (secondary axis) of the elliptical cross section is perpendicular to the plane.

The diversion of the flow of the pressure medium within the pressure medium duct may be substantially through 90 degrees.

Further measures which improve the exemplary embodiments and/or exemplary methods of the present invention will be described in more detail below together with the description of an exemplary embodiment of the present invention on the basis of the drawings.

BRIEF DESCRIPTION OF THE DRAWINGS

FIG. 5 shows a perspective illustration of a pressure medium duct formed in a housing of the pressure control valve arrangement of FIG. 3.

DETAILED DESCRIPTION

Figure 1:
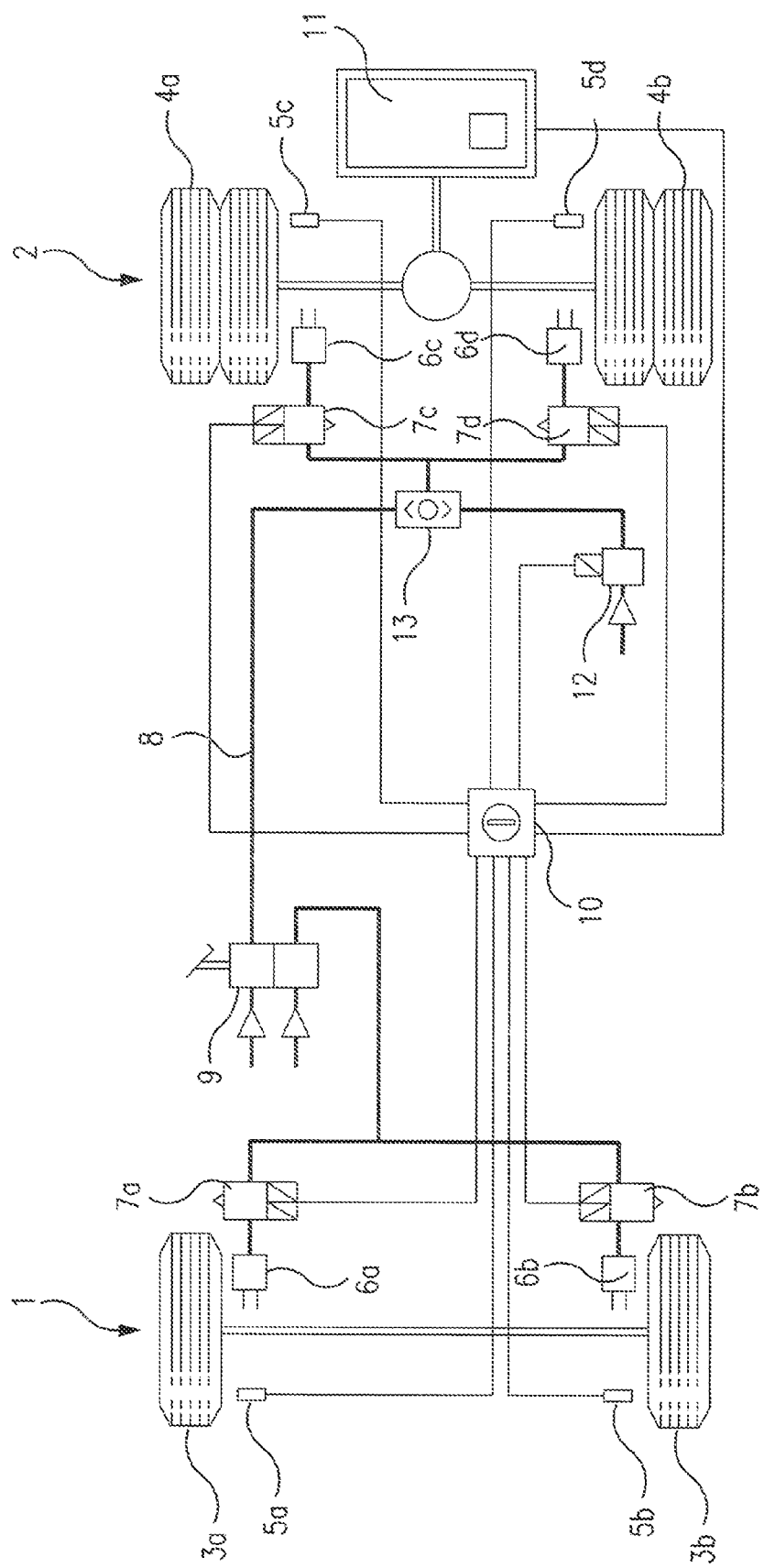
FIG. 1 shows a diagrammatic illustration of an ABS brake system as a general schematic of a 4S/4C ABS brake system of a vehicle.

According to FIG. 1, a vehicle equipped with an ABS brake system has a front axle 1 and a rear axle 2. Arranged on the front axle 1 are wheels 3a and 3b; the rear axle 2 has for example wheels 4a and 4b each with twin tires. The ABS brake system used for braking the wheels 3a, 3b and 4a, 4b is configured here in the form of a 4S/4C system (four sensors, four channels). This means that, here, a total of four rotational speed sensors 5a-5d and four pressure control valve arrangements 7a-7d are provided. The pressure control valve arrangements 7a-7d serve for actuating respectively associated brake cylinders 6a-6d. All of the pressure control valve arrangements 7a-7d are connected via a branching pneumatic brake pressure line 8 to a foot brake valve 9.

The driver, when actuating the foot brake valve 9, generates a brake pressure which is transmitted via the pneumatic brake pressure line 8 through the pressure control valve arrangements 7a-7d to the brake cylinders 6a-6d assigned to the wheels 3a, 3b and the wheels 4a, 4b.

Figure 2A:
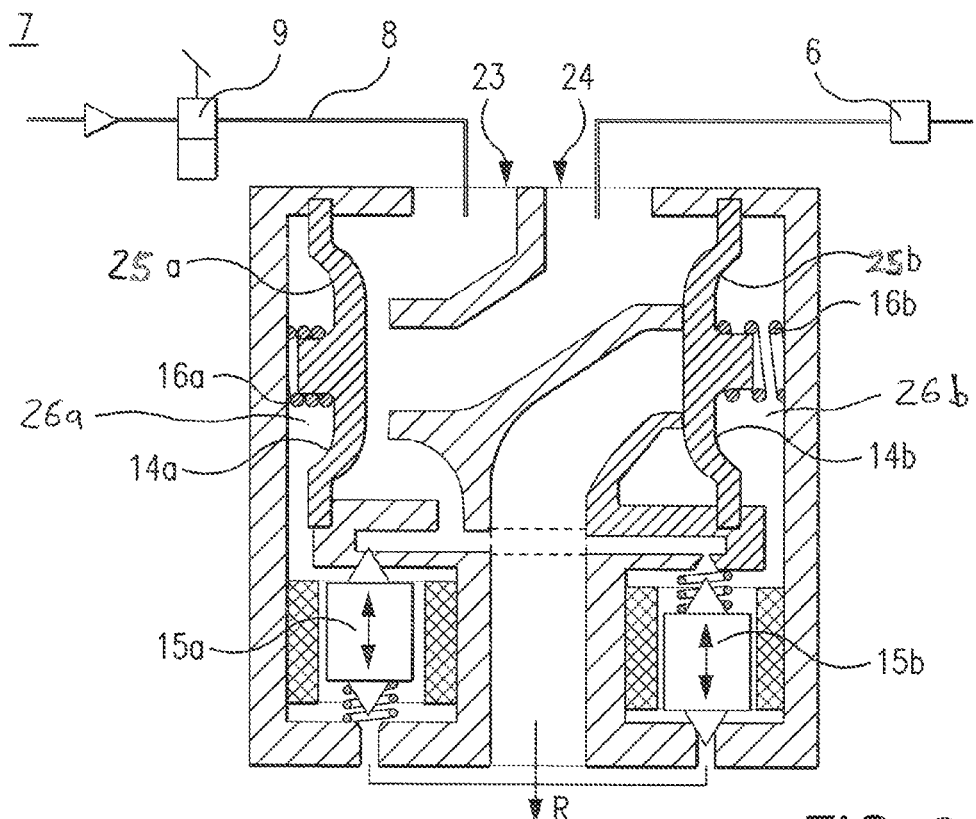
FIG. 2a shows a schematic illustration of a pressure control valve arrangement which activates a brake cylinder, in the open state (pressure build-up).
Figure 2B:
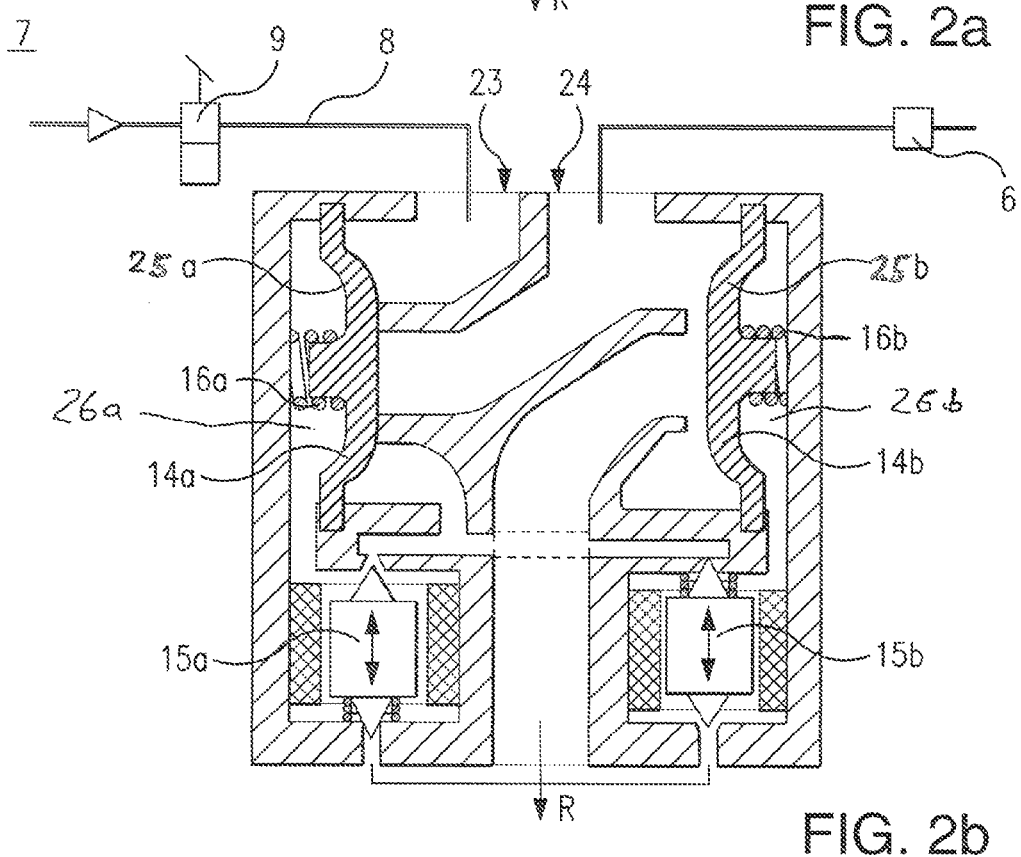
FIG. 2b shows a schematic illustration of the pressure control valve arrangement of FIG. 2a in the closed state (pressure dissipation).
Figure 4:
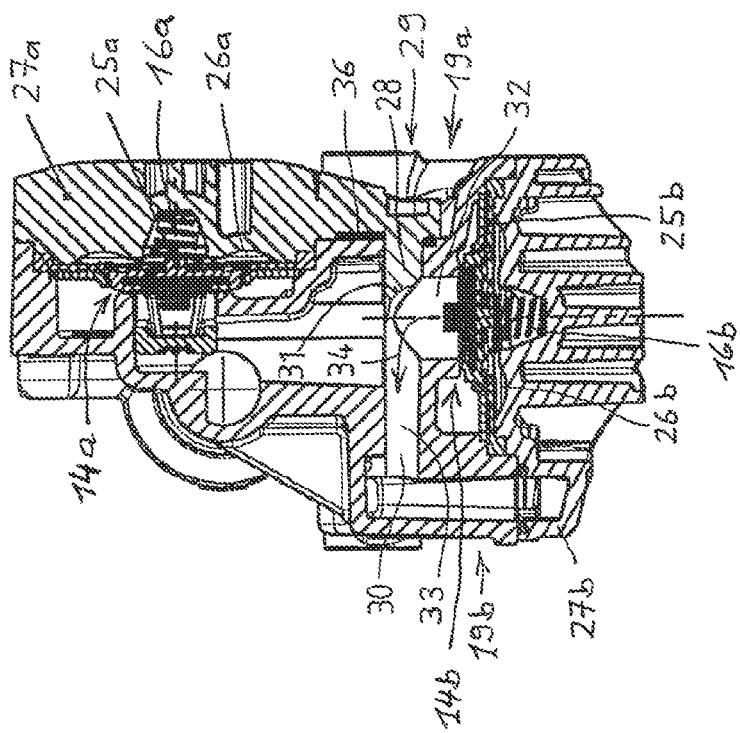
FIG. 4 shows a sectional illustration along the line IV-IV of FIG. 3.

The pressure control valve arrangements 7a-7d can be activated by integrated electromagnetic valves 15a, 15b shown in FIG. 2a, FIG. 2b and FIG. 4, and for this purpose are electrically connected to a central electronic control unit 10. At the input side, the electronic control unit 10 is connected to the four rotational speed sensors 5a-5b which determine the wheel speeds. In the event of locking of a wheel 3a-3d, the brake pressure input by the driver by the foot brake valve 9 is reduced, in accordance with an ABS regulating process and under the control of the electronic control unit 10, by the corresponding pressure control valve arrangement 7a-7d until the locking is eliminated. The ABS brake system of the present exemplary embodiment also comprises an ASR function, which comprises an ASR unit 11 for reducing the engine torque and also an ASR solenoid valve 12 and a shuttle valve 13.

The pressure control valve arrangement 7 used as per FIG. 2a within the ABS brake system for the purpose of ABS regulation is in this case constructed in the form of a single-duct pressure control valve arrangement, and is composed substantially of two integrated diaphragm valves 14a and 14b and two spring-loaded electromagnetic valves 15a, 15b which activate the diaphragm valves. The diaphragm valves 14a and 14b are in each case loaded in the closing direction by spring elements 16a, 16b and are pilot-controlled by the respectively associated electromagnetic valves 15a and 15b.

The pressure control valve arrangement 7 is shown in FIG. 2a in its open position in which a build-up of pressure to the connected brake cylinder 6 takes place. Here, neither of the solenoid valves 15a and 15b is electrically activated. In the position shown, the compressed air passing from the foot brake valve 9 pushes open the diaphragm valve 14a, which is formed as an inlet valve. By the normally closed electromagnetic valve 15a, the associated diaphragm valve 14a is prevented from being closed again. By the normally open second electromagnetic valve 15b, the brake pressure passing from the foot brake valve 9 closes the second diaphragm valve 14b, which serves as an outlet valve. The compressed air thus passes unhindered through the pressure control valve arrangement 7. The pressure control valve arrangement 7 is also situated in this state when no ABS regulation is taking place.

To hold the brake pressure in a brake cylinder 6a to 6d constant, it is necessary merely to supply an electrical current to the electromagnetic valve 15a, as a result of which the latter opens and, as a result, the brake pressure passing from the foot brake valve 9 pushes the inlet-side diaphragm valve 14a closed. The pressure is now equal on the right-hand side and on the left-hand side of the diaphragm valve 14a. However, since the effective area on the left-hand side of the diaphragm valve 14a is larger, the diaphragm valve 14a is closed. This applies correspondingly to the outlet-side diaphragm valve 14b activated by the electromagnetic valve 15b. To hold the pressure constant, the pressure control valve arrangement 7 thus closes the pneumatic brake pressure line 8 running from the foot brake valve 9 to the brake cylinder 6.

According to FIG. 2b, a pressure dissipation in a brake cylinder 6a to 6d is realized by virtue of both electromagnetic valves 15a and 15b being supplied with electrical current. The above description with regard to the pressure holding applies to the electromagnetic valve 15a and the associated inlet side diaphragm valve 14a. In contrast, the other electromagnetic valve 15b is closed owing to the supply of electrical current. The pressure passing from the brake cylinder 6 thus pushes open the outlet-side diaphragm valve 14b, and the brake cylinder 6 is deaerated.

The above-described functions of the pressure control valve arrangement 7 are carried out, under the control of the electronic control unit 10, within the framework of an ABS/ASR regulating process in the manner described above.

Figure 3:
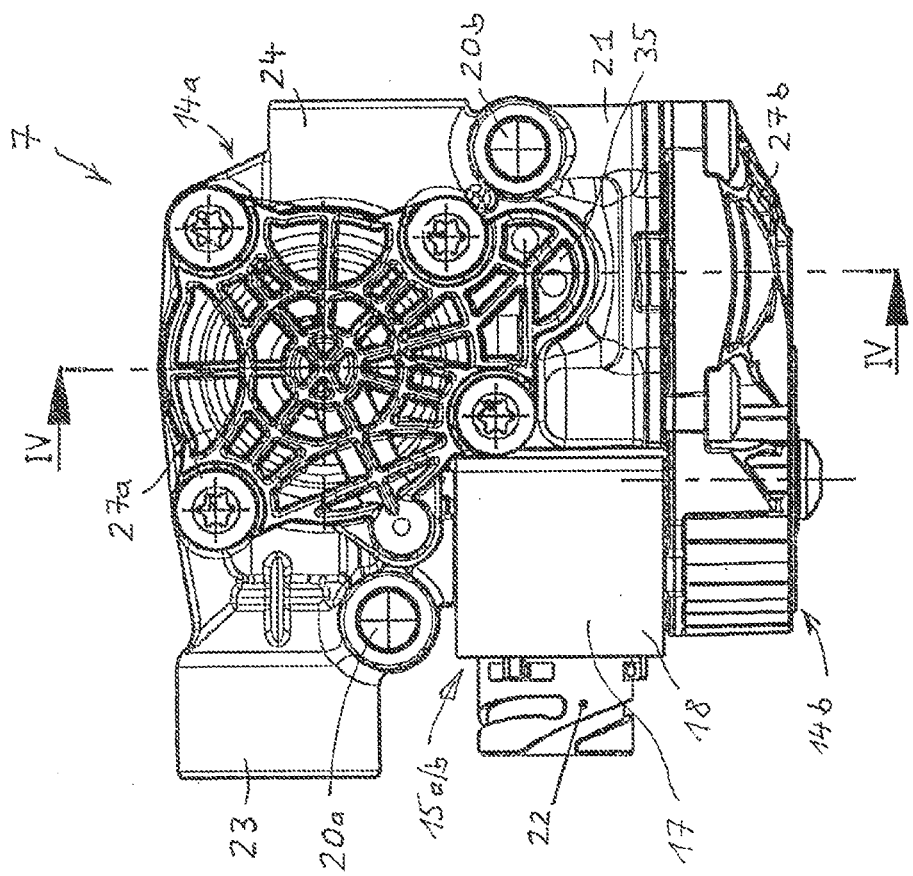
FIG. 3 shows a side view of a physical embodiment of the pressure control valve arrangement of FIG. 2a and FIG. 2b according to a exemplary embodiment of the present invention.

The pressure control valve arrangement 7 illustrated merely schematically in FIG. 2a and FIG. 2b is shown in FIG. 3 to FIG. 5 in a physical embodiment in the installed position, that is to say components illustrated at the top are situated at the top. In this embodiment, the two electromagnetic valves 15a, 15b for the pilot control of the diaphragm valves 14a, 14b are combined in a double solenoid valve, the function of which is however analogous to that of individual valves 15a, 15b.

The two electromagnetic valves 15a, 15b have a double magnet 18 which is combined in a block 17 and which has two magnet coils which interact with two solenoid valve seats. Magnet armatures (not explicitly shown here) as valve closing members, which interact with the solenoid valve seats of the electromagnetic valves 15a, 15b, are actuated by a supply of electrical current to the magnet coils.

The block 17 which comprises the double magnet 18 may be fastened at the front side to a housing 21 of the pressure control valve arrangement 7, and has a plug connection 22 for the supply of electrical current to the double magnet 18. The housing 21 also has a pressure medium port 23 for the application of pressure to and/or release of pressure from the pressure control valve arrangement 7, and a working port 24 for the connection of the brake cylinder 6 (FIG. 3).

The pressure medium port 23 is, as shown in FIG. 2a and FIG. 2b, connected via the brake pressure line 8 to the foot or service brake valve 9 of the pressure-medium-actuated brake device, and is aerated or deaerated in accordance with an actuation of the foot brake valve 9.

As can be seen in particular from FIG. 3, the housing 21 is provided with at least one, in this case for example two through bores 20a, 20b which open into the two side surfaces 19a, 19b of the housing 21 and through which project retaining means, for example screws, for retaining the pressure control valve arrangement on a support body, for example on a chassis of the vehicle. The central axes of the two through bores 20a, 20b may be parallel to one another. The axial length of the through bores 20a, 20b is a standardized installation dimension of the pressure control valve arrangement 7 and is defined, and cannot be varied, for space reasons; the axial length is defined by the maximum admissible width B of the housing 21.

One diaphragm valve 14a may be arranged on the side and the other diaphragm valve 14b may be arranged on the base of the housing 21, as shown in FIG. 4. Such a diaphragm valve 14a, 14b has as a valve body a diaphragm 25a, 25b which can be acted on by the introduction of pressure medium into a control chamber 26a, 26b which is covered at the outside of the housing in each case by a cover 27a, 27b produced by a primary forming process such as injection molding, which cover is fastened to the housing 21. Here, the control chamber 26a, 26b is formed between the diaphragm 25a, 25b and the cover 27a, 27b.

As can be seen in particular from FIG. 4, the cover 27a which closes off the control chamber 26a of the diaphragm valve 14a arranged on the side has a projection or peg 28 which projects from the outside into a mouth opening 29 of a pressure medium duct 30 in the housing. On the projection 28 there is formed a pressure medium guiding surface 31 for diverting the flow of the pressure medium conducted in the pressure medium duct 30.

Through the pressure medium duct 30, there may take place a diversion of the flow of the pressure medium from an upstream part of the pressure medium duct 30 leading in one direction into a downstream part of the pressure medium duct 30 leading in another direction.

In the exemplary embodiment, through the pressure medium duct 30, there takes place for example a 90° diversion of the flow of the pressure medium from a first portion 32 of the pressure medium duct 30, the first portion 32 being vertical in FIG. 4 and being flow-connected to a valve seat of the diaphragm valve 14a which functions as an outlet valve and whose control chamber 26a is covered by the cover 27a, into a portion 33 of the pressure medium duct 30, the portion 33 being horizontal in FIG. 4 and being flow-connected to a deaeration port (not explicitly visible here) formed on the housing 21, as illustrated by the arrow 34, which symbolizes the flow direction, in FIG. 4.

Here, viewed from the interior of the housing 21, the horizontal portion 33 of the pressure medium duct widens toward the mouth opening 29 in the side surface 19a of the housing 21. The projection 28 of the cover 27a projects in the manner of a peg into the mouth opening 29.

In the present case, the pressure medium duct 30 therefore may be a deaeration duct via which compressed air from the working port 24 connected to a brake cylinder is supplied, via the outlet valve configured as a diaphragm valve 14a, for a ventilation of the pressure control valve arrangement 7.

The pressure medium guiding surface 31 of the projection 28 is configured to divert the flow of the pressure medium from one direction (in this case the vertical direction) into the other direction (in this case the horizontal direction), or to assist such a diversion, which may be by a spherical surface.

The cover 27a which is provided with the projection 28 and the pressure medium guiding surface 31 may particularly be formed as a single-piece injection-molded formed body composed of plastic or metal.

The central region of the cover 27a particularly may serve to cover the control chamber 26a, and the projection 28 with the pressure medium guiding surface 31 is formed on the cover 27a at the edge, for example on a lug 35 of the cover 27a, as shown in FIG. 3. A corresponding seal 36 in the region of the mouth opening 29 serves to seal off the pressure medium duct 30 to the outside.

A cover 27a with a projection 28 and pressure medium guiding surface 31 is not imperatively restricted to a use for a pressure medium duct 30 with a 90 degree diversion of the flow direction. In fact, such a cover 27a may be used for any type of pressure medium duct 30, in particular even for a pressure medium duct without a flow diversion, in which a reduction of the flow resistance can be obtained by a pressure medium guiding surface.

In an embodiment shown in FIG. 5, within a pressure medium duct 30 formed in the housing 21, there is provided a diversion of the flow of the pressure medium from a portion 32a of the pressure medium duct 30 leading in one direction, in this case for example vertically, into a portion 33*a* of the pressure medium duct 30 leading in another direction, in this case for example horizontally. The diversion of the flow of the pressure medium within the pressure medium duct 30 may therefore be through substantially 90 degrees.

The pressure medium duct 30 has in particular a knee-like pressure medium guiding surface 31*a* for diverting the flow of the pressure medium conducted in the pressure medium duct 30 from the portion 32*a* leading in one direction into the portion 33*a* leading in the other direction. Here, the pressure medium duct 30 is produced together with the housing 21 by primary forming, which may be as an injection-molded formed part composed of metal.

As shown in FIG. 5, the cross section 37 of the pressure medium duct 30 is of oval configuration, and the major dimension a of the oval cross section 37 and the central axis 38 of the pressure medium duct 30 are arranged in a common plane, which in FIG. 5 is the plane of the drawing, over the entire length of the pressure medium duct 30. Furthermore, the minor dimension b of the oval cross section 37 is perpendicular to the plane.

It may particularly provide for the cross section 37 of the pressure medium duct 30, as a special case of an oval cross section, to be of elliptical configuration, wherein again the major dimension (principal axis a) of the elliptical cross section 37 and the central axis 38 of the pressure medium duct 30 are arranged in a common plane and the minor dimension (secondary axis b) of the elliptical cross section 37 is perpendicular to the plane.

The oval cross section 37 may generally have one, two or even no axes of symmetry; it is essential merely that the dimension b perpendicular to the plane comprising the central axis 38 of the pressure medium duct 30 is smaller than the dimension a in the plane, wherein the dimensions a and b constitute in each case the largest extents of the cross section 37 in the respective direction.

LIST OF REFERENCE SYMBOLS

1 Front Axle
2 Rear Axle
3 Wheel
4 Wheel
5 Rotational Speed Sensor
6 Brake Cylinder
7 Pressure Control Valve Arrangement
8 Brake Pressure Line
9 Foot Brake Valve
10 Control Unit
11 ASR Unit
12 ASR Solenoid Valve
13 Shuttle Valve
14*a/b* Diaphragm Valve
15*a/b* Electromagnetic Valve
16*a/b* Spring Element
17 Block
18 Double Magnet
19*a/b* Side Surface
20*a/b* Through Bore
21 Housing
22 Plug Connection
23 Pressure Medium Port
24 Working Port
25*a/b* Diaphragms
26*a/b* Control Chambers
27*a/b* Covers
28 Projection
29 Mouth Opening
30*a/b* Pressure Medium Duct
31*a/b* Pressure Medium Guiding Surface
32*a/b* Portion
33*a/b* Portion
34 Arrow
35 Lug
36 Seal
37 Cross Section
38 Central Axis

The invention claimed is:

1. A pressure control valve arrangement for controlling a fluid pressure in an ABS brake system of a vehicle such that, in the event of a tendency of individual wheels of the vehicle to lock, the brake pressure in at least one associated brake cylinder can be adaptively adjusted, comprising:
a housing in which is formed at least one single-piece injection-molded pressure medium conducting pressure medium duct and in which is provided a diversion of the flow of the pressure medium within the pressure medium duct from a portion of the pressure medium duct leading in one direction into a portion of the pressure medium duct leading in another direction;
wherein the pressure medium duct is produced together with the housing, and
wherein cross sections of the pressure medium duct are oval-shaped before and after a bend in the duct and the major dimension of the oval cross section and the central axis of the pressure medium duct are arranged in a common plane, and the minor dimension of the oval cross section is perpendicular to the plane,
wherein viewed from an interior of the housing, a horizontal portion of the pressure medium duct widens toward an opening in a side surface of the housing,
wherein the cross section of the pressure medium duct is elliptical, wherein the housing is an injection-molded formed body composed of metal, and wherein the pressure medium duct has a knee-like pressure medium guiding surface for diverting the flow of the pressure medium conducted in the pressure medium duct from the portion leading in one direction into the portion leading in the other direction,
wherein a diaphragm valve is arranged on a side of the housing and another diaphragm valve is arranged on a base of the housing, the diaphragm valves each having a valve body diaphragm which can be acted on by the introduction of the pressure medium into a corresponding control chamber which is covered at the outside of the housing in each case by a corresponding cover fastened to the housing, each of the control chambers being formed between a corresponding one of the diaphragms and the covers,
wherein one of the covers, which closes off the corresponding control chamber of the corresponding diaphragm valve arranged on the side, has a projection or peg which projects from the outside into a mouth opening of the pressure medium duct in the housing, on the projection there is formed a pressure medium guiding surface for diverting the flow of the pressure medium conducted in the pressure medium duct, and
wherein through the pressure medium duct, there takes place a diversion of the flow of the pressure medium from an upstream part of the pressure medium duct leading in one direction into a downstream part of the pressure medium duct leading in another direction.

2. The pressure control valve arrangement of claim 1, wherein the diversion of the flow of the pressure medium within the pressure medium duct is through substantially 90 degrees.

3. The pressure control valve arrangement of claim 1, wherein at least one diaphragm valve is accommodated in the housing.

4. The pressure control valve arrangement of claim 3, wherein there is at least one electromagnetic control valve, accommodated in the housing, which is activatable by an electronic control device and which serves as the pilot control of the diaphragm valve.

5. A brake-slip-regulated and pressure-medium-actuated brake device of a vehicle, comprising:
- at least one pressure control valve arrangement for controlling a fluid pressure in an ABS brake system of a vehicle such that, in the event of a tendency of individual wheels of the vehicle to lock, the brake pressure in at least one associated brake cylinder can be adaptively adjusted, including:
- a housing in which is formed at least one single-piece injection-molded pressure medium conducting pressure medium duct and in which is provided a diversion of the flow of the pressure medium within the pressure medium duct from a portion of the pressure medium duct leading in one direction into a portion of the pressure medium duct leading in another direction;
- wherein the pressure medium duct is produced together with the housing, and
- wherein cross sections of the pressure medium duct are oval-shaped before and after a bend in the duct and the major dimension of the oval cross section and the central axis of the pressure medium duct are arranged in a common plane, and the minor dimension of the oval cross section is perpendicular to the plane,
- wherein viewed from an interior of the housing, a horizontal portion of the pressure medium duct widens toward an opening in a side surface of the housing,
- wherein the cross section of the pressure medium duct is elliptical, wherein the housing is an injection-molded formed body composed of metal, and wherein the pressure medium duct has a knee-like pressure medium guiding surface for diverting the flow of the pressure medium conducted in the pressure medium duct from the portion leading in one direction into the portion leading in the other direction,
- wherein a diaphragm valve is arranged on a side of the housing and another diaphragm valve is arranged on a base of the housing, the diaphragm valves each having a valve body diaphragm which can be acted on by the introduction of the pressure medium into a corresponding control chamber which is covered at the outside of the housing in each case by a corresponding cover fastened to the housing, each of the control chambers being formed between a corresponding one of the diaphragms and the covers,
- wherein one of the covers, which closes off the corresponding control chamber of the corresponding diaphragm valve arranged on the side, has a projection or peg which projects from the outside into a mouth opening of the pressure medium duct in the housing, on the projection there is formed a pressure medium guiding surface for diverting the flow of the pressure medium conducted in the pressure medium duct, and
- wherein through the pressure medium duct, there takes place a diversion of the flow of the pressure medium from an upstream part of the pressure medium duct leading in one direction into a downstream part of the pressure medium duct leading in another direction.

6. The brake device of claim 5, wherein the diversion of the flow of the pressure medium within the pressure medium duct is through substantially 90 degrees.

7. The brake device of claim 5, wherein at least one diaphragm valve is accommodated in the housing.

8. The brake device of claim 7, wherein there is at least one electromagnetic control valve, accommodated in the housing, which is activatable by an electronic control device and which serves as the pilot control of the diaphragm valve.

* * * * *